United States Patent
Henning et al.

(10) Patent No.: US 6,869,102 B2
(45) Date of Patent: Mar. 22, 2005

(54) TRANSPORT ASSEMBLY

(75) Inventors: Nils Henning, Rostock (DE); Monika Seddig, Laag (DE); Jens Holzapfel, Grenz (DE); Henri Engler, Rostock (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 43 days.

(21) Appl. No.: 10/622,525

(22) Filed: Jul. 18, 2003

(65) Prior Publication Data

US 2004/0140655 A1 Jul. 22, 2004

(30) Foreign Application Priority Data

Jul. 19, 2002 (DE) ..................................... 202 10 948 U

(51) Int. Cl.[7] .............................................. B60R 21/26
(52) U.S. Cl. ...................... 280/736; 280/740; 280/741
(58) Field of Search ................................ 280/736, 737, 280/740, 741; 222/3; 215/249, 270

(56) References Cited

U.S. PATENT DOCUMENTS

| | | | |
|---|---|---|---|
| 3,889,703 A | 6/1975 | Keathley | |
| 5,472,229 A | 12/1995 | Bishop et al. | |
| 5,671,945 A | * 9/1997 | Rhule et al. | ................. 280/740 |
| 5,879,345 A | 3/1999 | Aneas | |
| 6,308,984 B1 | * 10/2001 | Fischer | ........................ 280/741 |
| 6,537,263 B1 | * 3/2003 | Aneas | ......................... 604/412 |

FOREIGN PATENT DOCUMENTS

DE          10020796 A1    12/2000

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

A transport assembly comprises a gas generator having an outer housing which has at least one outflow opening arranged such that a thrust force is exerted onto the outer housing during an outflow of generated gas. The transport assembly further comprises a removable transport cover which is detachably fastened to the outer housing and extends around the outflow opening of the outer housing. Further outflow openings are arranged in the transport cover such that the transport assembly as a whole remains neutral with respect to thrust on activation of the gas generator. A plug connection is provided between the transport cover and the outer housing.

17 Claims, 1 Drawing Sheet

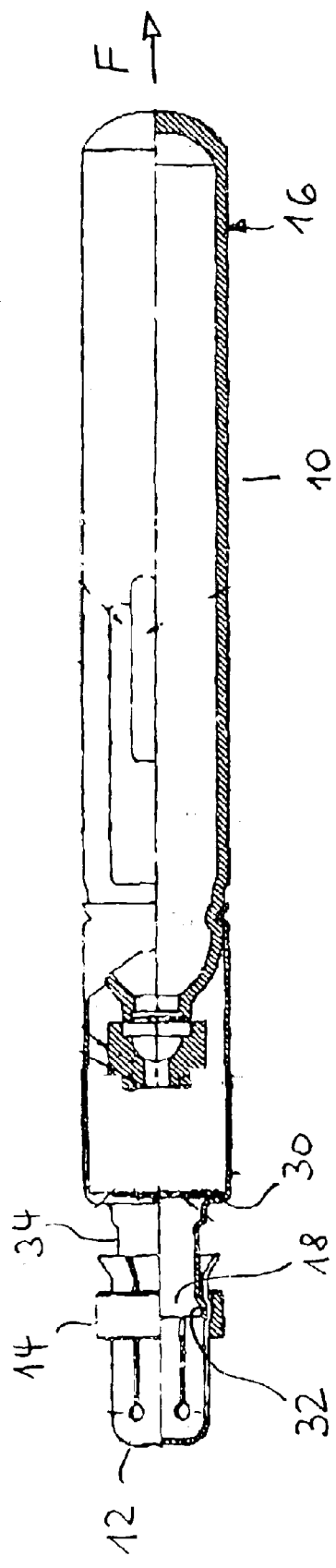
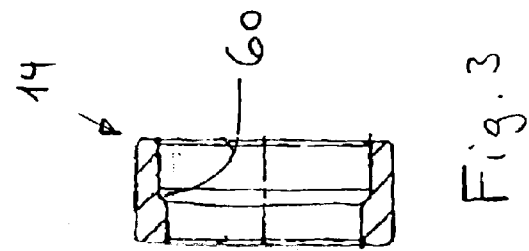
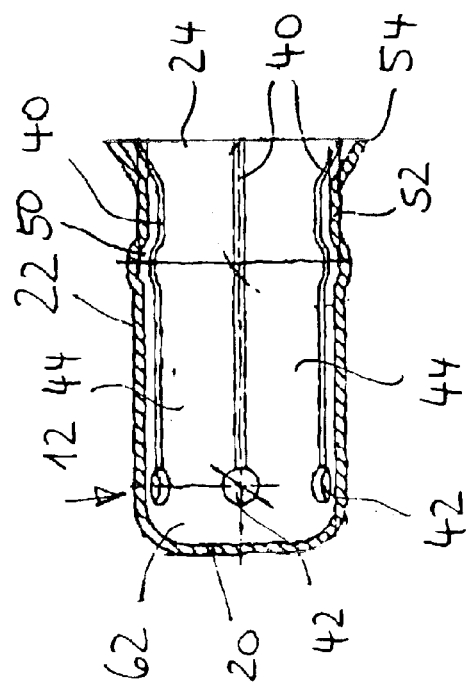
Fig. 1
Fig. 2
Fig. 3

TRANSPORT ASSEMBLY

TECHNICAL FIELD

The invention relates to a transport assembly for being attached to a gas generator.

BACKGROUND OF THE INVENTION

A transport assembly may comprise a gas generator having an outer housing, in particular for a vehicle occupant restraint system, the outer housing having at least one outflow opening arranged such that a thrust force is exerted onto the outer housing during the outflow of generated gas, and a removable transport cover which is detachably fastened to the outer housing and extends around the outflow opening, further outflow openings being arranged in the transport cover such that the transport assembly as a whole remains neutral with respect to thrust on activation of the gas generator.

Gas generators are known for the activation of vehicle occupant protection devices, which are not constructed so as to be neutral with respect to thrust. The gas generator has, for example, at one end an axial outflow opening, and does not have one at the other end, however. Other embodiments of gas generators which are not neutral with respect to thrust have outflow openings provided only in particular partial regions on the circumference, and not outflow openings which are uniformly distributed across the circumference. On transporting of these gas generators, i.e. before their installation, these gas generators which are not neutral with respect to thrust, are to be provided with a type of securing means which ensures neutrality with respect to thrust. For this reason, a transport cover is fastened to the outer housing, which receives the gas between the outer housing and itself in a kind of distributor chamber and emits the gas uniformly to the exterior via its own outflow openings, so that the closed assembly unit as a whole is neutral with respect to thrust. It was intended to screw such transport covers securely to the outer housing and to unscrew the transport cover again before the installation of the gas generator.

German Patent Application DE 100 20 796 shows an end piece of a gas lance attached to the outer housing of a gas generator which is, per se, neutral in thrust. Such end piece, however, is a part joining the gas generator and the gas lance and is not a transport cover for the outflow side of the gas generator. Further, when attached to the gas generator, the unit gas generator and gas lance is not neutral with respect to thrust.

U.S. Pat. No. 5,879,345 shows a plastic sealing sleeve permanently attached to a container filled with liquid. This document does not refer to gas generators. The sleeve makes the container tamperproof. If used with a gas generator, the sleeve would immediately be destroyed by the gas pressure and, thus, is not able to provide for a neutrality of thrust.

BRIEF SUMMARY OF THE INVENTION

According to the invention, a transport assembly comprises a gas generator having an outer housing which has at least one outflow opening arranged such that a thrust force is exerted onto the outer housing during an outflow of generated gas. The transport assembly further comprises a removable transport cover which is detachably fastened to the outer housing and extends around the outflow opening of the outer housing. Further outflow openings are arranged in the transport cover such that the transport assembly as a whole remains neutral with respect to thrust on activation of the gas generator. A plug connection is provided between the transport cover and the outer housing. This plug connection allows a quicker installation and, above all, also a quicker dismantling of the transport cover. It is important that the transport cover is not destroyed by the activated gas generator in the assembled state.

Preferably, the plug connection can be detached from the outer housing without being destroyed, so that the transport cover can be used again. Therefore, also, materials of higher quality can be used for the transport cover.

According to the preferred embodiment, the transport cover is provided with at least one projection which engages into a recess on the outer housing. It would in fact be possible to construct this projection itself so as to be elastic; however, according to the preferred embodiment, the projection is provided on an elastic section of the transport cover, which as a whole makes greater deflection distances possible.

In addition, provision is made that the transport cover is adapted to be fastened and arrested by axial pushing onto the outer housing, which allows a very rapid installation.

Vice versa, for rapid dismantling, the plug connection is to be constructed such that through axial withdrawal of the transport cover, the latter can be dismantled from the outer housing.

When the transport cover has at least one elastic finger produced through longitudinal slots, which finger engages into a recess on the outer housing, the plug connection can preferably be realized without additional components on the transport cover.

Preferably, the transport cover even has several adjacent elastic fingers or even exclusively adjacent elastic fingers at one end, distributed on its entire circumference, so that the transport cover widens as a whole on being pushed onto the outer housing, in order finally engage therein on reaching the recess or depression.

The longitudinal slots for the production of the elastic finger or fingers preferably continue into the outflow openings. The outflow openings therefore have a dual function, by also serving as mechanical relief bores at the end of the longitudinal slots. On widening of the fingers, therefore, the tensions in the wall of the outflow openings are uniformly distributed, which reduces the load peaks.

Preferably, the transport assembly is additionally provided with a separate securing piece which is adapted to be fastened to the transport cover and in the installed state prevents a detachment of the securing piece from the outer housing. This additional securing piece is intended to form a further mechanical securing means.

The securing piece may, for example, be a securing ring which, for example, is adapted to be pushed onto the transport cover and removed from it again.

The securing piece may, in addition, be constructed at least partially so as to be conical, which makes a withdrawal from the transport cover difficult and possibly provides an additional friction fit through a kind of wedge effect.

The invention makes provision that the transport cover can be a cap which is adapted to be pushed onto one end of the gas generator, in particular onto an axial end thereof. Between the cap and the outer housing, a gas distribution space is produced, via which the gas can finally flow to the outflow openings which are uniformly distributed on the circumference of the cap.

According to a preferred embodiment, the gas generator has an axial outlet opening, whereas the transport cover has outflow openings distributed uniformly with respect to the circumference. The gas flow, which emerges axially from the gas generator, is in fact deflected in order to then flow out radially, distributed uniformly, from the transport assembly.

The plug connection is preferably an axial detent connection; however, it may also be a bayonet closure, in which additionally a relative rotation between the transport cover and the outer housing is necessary for installation.

BRIEF DESCRIPTION OF THE DRAWINGS

FIG. 1 shows a side view of a transport assembly according to the invention,

FIG. 2 shows a longitudinal sectional view through the transport cover shown in FIG. 1 and FIG. 3 shows a sectional view through the securing ring, likewise shown in FIG. 1.

DETAILED DESCRIPTION OF THE PREFERRED EMBODIMENT

In FIG. 1 a transport assembly is shown, consisting of a gas generator 10, a cap-shaped transport cover 12 and a securing piece in the form of a securing ring 14. The gas generator 10 has an outer housing 16 consisting of several parts, and is constructed as an elongated tubular gas generator. At one axial end, the outer housing 16 is provided with an axial outflow opening 18 via which the gas, released on activation of the gas generator, emerges from the outer housing 16.

As the outflow opening 18 is the single gas outlet opening, a thrust is produced on activation, in the installed state of the gas generator 10. The thrust force which is produced leads to a force being exerted in the direction of the arrow F onto the outer housing 16. Therefore, in other words, the gas generator is not constructed so as to be neutral with respect to thrust.

In the transport state of the gas generator or when it is in storage and before it is built in, however, the transport cover 12 illustrated in FIG. 2 is placed onto the axial end with the outflow opening 18.

The transport cover 12 is of metal and constructed in a cup or cap shape, with a closed base 20 and a peripheral wall 22 adjoining thereto. Reference number 24 designates the open end of the transport cover 12, by which in advance it is placed onto the axial end of the outer housing 16.

The connection between the outer housing 16 and the transport cover 12 is constructed as a plug connection.

This plug connection is described in further detail below. In the region of the outflow opening 18, the outer housing 16 has a shaped tube 30 which, in relation to the illustrated left end, firstly has a widened section 32, adjoining which in axial direction is a depression or recess 34, similar to a peripherally closed groove.

The transport cover 12, beginning from the open end, has longitudinal slots 40 running axially and uniformly distributed on the circumference, which open out towards the base 20 into radial outflow openings 42. The outflow openings 42 are of equal size and are uniformly distributed across the circumference.

Between the longitudinal slots 40, elastic sections are produced, also designated as elastic fingers 44, which represent segments of the peripheral wall 22.

Starting from the base 22, the peripheral wall 22 firstly has a cylindrical section, then a ring-shaped, outwardly-directed curvature 50, adjoining which are a ring-shaped projection 52 and finally an end 54 which widens in a funnel shape.

The securing ring 14 is a peripherally closed ring, preferably of steel, with an inner face which has a short conical shoulder 60.

After the production of the gas generator, for its storage and transport, the transport cover 12 is fastened to the outer housing in the region of the tube 30 exclusively by being pushed on axially. On being pushed on, the fingers 44 yield radially outwards. As soon as the widened section 43 engages into the curvature 50 and at the same time the projection 52 can snap into the recess 34, the elastic fingers 44 will move radially inwards again, so that a detent connection is ensured see FIG. 1.

The detent connection could of course also be constructed with barb-shaped self-securing projections and undercut grooves, so that a separate securing piece such as the securing ring 14 would no longer have to be present. Such a construction, however, would require a greater effort for the removal of the transport cover 12. Such detent connections are also, in part, only able to be detached with a special tool or by being destroyed.

In the embodiment shown, on the other hand, the transport cover 12 can be re-used as often as desired and be detached from the outer housing 16 very quickly and with minimum effort.

This is made possible by the securing ring 14 which, when the transport cover 12 has been installed, is pushed from the exterior over the transport cover 12 until the shoulder 60 presses against the bead-like projection which is formed on the outer face of the curvature 50 (see FIG. 1). The securing ring 14 acts like a cone and ensures that the transport cover 12 sits free from play and tightly on the tube 30.

Alternatively, it would of course also be possible to provide a further detent connection between the securing ring 14 and the transport cover 12.

For dismantling, the securing ring 14 is withdrawn from the transport cover 12 again by pure axial movement, whereupon the cover 12 can be detached again from the outer housing 16 by exclusively axial withdrawal.

If, in storage or on transportation of the completed transport assembly, the gas generator 10 were to be inadvertently activated, the gas flows via the outflow opening 18 into the interior of the transport cover 12, which forms a gas distribution space 62. Via the outflow openings 42 and also the longitudinal slots 40, the gas finally flows radially outwards, the entire transport assembly, as stated, being neutral here with respect to thrust.

What is claimed is:

1. A transport assembly comprising
   a gas generator having an outer housing which has at least one outflow opening arranged such that a thrust force is exerted onto said outer housing during an outflow of generated gas, and
   a removable transport cover which is detachably fastened to said outer housing and extends around said outflow opening of said outer housing, further outflow openings being arranged in said transport cover such that said transport assembly as a whole remains neutral with respect to thrust on activation of said gas generator,
   a plug connection being provided between said transport cover and said outer housing.

2. The transport assembly according to claim 1, wherein said plug connection can be detached without being destroyed.

3. The transport assembly according to claim 1, wherein said transport cover has at least one projection which engages into a recess provided on said outer housing.

4. The transport assembly according to claim 3, wherein said transport cover has an elastic section, on which said projection is provided.

5. The transport assembly according to claim 1, wherein said transport cover is fastened by axial pushing onto said outer housing and adapted to be arrested there.

6. The transport assembly according to claim 1, wherein said transport cover is adapted to be dismantled by axial withdrawal from said outer housing.

7. The transport assembly according to claim 3, wherein said transport cover has at least one elastic finger produced through longitudinal slots, which engages into said recess on said outer housing.

8. The transport assembly according to claim 7, wherein said transport cover has several of said elastic fingers provided adjacent to each other.

9. The transport assembly according to claim 8, wherein said longitudinal slots have one axial end where they continue into said further outflow openings in said transport cover.

10. The transport assembly according to claim 1, wherein a separate securing piece is provided which is adapted to be fastened to said transport cover and in an installed state prevents a detachment of said transport cover from said outer housing.

11. The transport assembly according to claim 10, wherein said securing piece is a securing ring.

12. The transport assembly according to claim 11, wherein said securing ring is adapted to be pushed onto said transport cover and removed from it again.

13. The transport assembly according to claim 10, wherein said securing piece is at least partially conical on an inner face thereof.

14. The transport assembly according to claim 1, wherein said transport cover is a cap which is adapted to be pushed onto an end of said gas generator.

15. The transport assembly according to claim 1, wherein said gas generator has an axial outflow opening.

16. The transport assembly according to claim 1, wherein said further outflow openings of said transport cover are uniformly distributed across a circumference of said transport cover.

17. The transport assembly according to claim 1, wherein said plug connection is one of an axial detent connection and a bayonet closure.

* * * * *